United States Patent
Berthout et al.

(10) Patent No.: US 11,338,277 B2
(45) Date of Patent: May 24, 2022

(54) DIRECT SYNTHESIS OF A SAPO MATERIAL WITH AFX STRUCTURE COMPRISING COPPER AND USE OF THIS MATERIAL

(71) Applicant: IFP Energies Nouvelles, Rueil-Malmaison (FR)

(72) Inventors: David Berthout, Vaugneray (FR); Bogdan Harbuzaru, Simandres (FR); Eric Llido, Communay (FR)

(73) Assignee: IFP Energies Nouvelles, Rueil-Malmaison (FR)

(*) Notice: Subject to any disclaimer, the term of this patent is extended or adjusted under 35 U.S.C. 154(b) by 180 days.

(21) Appl. No.: 16/617,624

(22) PCT Filed: May 18, 2018

(86) PCT No.: PCT/EP2018/063205
§ 371 (c)(1),
(2) Date: Nov. 27, 2019

(87) PCT Pub. No.: WO2018/219700
PCT Pub. Date: Dec. 6, 2018

(65) Prior Publication Data
US 2020/0086305 A1 Mar. 19, 2020

(30) Foreign Application Priority Data
May 31, 2017 (FR) ...................... 1754797

(51) Int. Cl.
*C01B 39/54* (2006.01)
*B01J 29/85* (2006.01)
*B01D 53/94* (2006.01)
*B01J 35/04* (2006.01)
*B01J 37/02* (2006.01)
*B01J 37/30* (2006.01)
*F01N 3/20* (2006.01)
*F01N 3/28* (2006.01)

(52) U.S. Cl.
CPC .......... *B01J 29/85* (2013.01); *B01D 53/9418* (2013.01); *B01J 35/04* (2013.01); *B01J 37/0215* (2013.01); *B01J 37/30* (2013.01); *C01B 39/54* (2013.01); *F01N 3/2066* (2013.01); *F01N 3/28* (2013.01); *F01N 3/2828* (2013.01); *B01D 2255/20761* (2013.01); *B01D 2255/50* (2013.01); *B01D 2255/9155* (2013.01); *B01J 2229/186* (2013.01); *C01P 2002/72* (2013.01); *C01P 2004/03* (2013.01); *F01N 2330/06* (2013.01); *F01N 2370/04* (2013.01); *F01N 2510/063* (2013.01); *F01N 2610/02* (2013.01); *F01N 2610/04* (2013.01)

(58) Field of Classification Search
None
See application file for complete search history.

(56) References Cited

U.S. PATENT DOCUMENTS

| 5,194,235 A | 3/1993 | Zones |
| 9,517,942 B2 | 12/2016 | Chen et al. |
| 10,486,145 B2 | 11/2019 | Martens et al. |
| 2016/0137518 A1 | 5/2016 | Rivas-Cardona et al. |

FOREIGN PATENT DOCUMENTS

| CN | 104743574 | * 11/2014 |
| JP | 2014148441 A | 8/2014 |
| WO | 17080722 A1 | 5/2017 |

OTHER PUBLICATIONS

Alessandro Turrina et al: "Understanding the structure directing action of copper-polyamine complexes in the direct synthesis of Cu-SAPO-34 and Cu-SAPO-18 catalysts for the selective catalytic reduction of NO with NH3", Microporous and Mesoporous Materials, vol. 215, Oct. 1, 2015 (Oct. 1, 2015), Amsterdam, NL, pp. 154-167, XP055268586, ISSN: 1387-1811 (Abstract).
Li Jiaying et al: "Synthesis of NH3-SCR Catalyst SAPO-56 with Different Aluminum Sources", Procedia Engineering, vol. 121, 2015, pp. 967-974, XP029288838, ISSN: 1877-7058.
International Search report PCT/EP2018/063205 dated Jun. 12, 2018 (pp. 1-15).

\* cited by examiner

*Primary Examiner* — Sheng H Davis
(74) *Attorney, Agent, or Firm* — Millen, White, Zelano and Branigan, P.C.; Harry B. Shubin

(57) ABSTRACT

The invention concerns a process for preparing a copper-comprising SAPO material with AFX structure, comprising at least the steps of mixing, in an aqueous medium, at least one aluminum source, at least one silicon source, at least one copper source, at least one phosphorus source, a TETA complexing agent and a TMHD structuring agent, in order to obtain a gel, and hydrothermal treatment of said gel with a shear rate of less than 50 s$^{-1}$ in order to obtain crystallization of said copper-comprising SAPO material with AFX structure.

16 Claims, 2 Drawing Sheets

DIRECT SYNTHESIS OF A SAPO MATERIAL WITH AFX STRUCTURE COMPRISING COPPER AND USE OF THIS MATERIAL

TECHNICAL FIELD OF THE INVENTION

The subject of the invention is a process for preparing a silico-aluminophosphate (SAPO) zeolite material with AFX structure, and also the use of this material, in particular for the selective catalytic reduction of NOx in the presence of a reducing agent, especially on diesel or controlled-ignition engines.

PRIOR ART

Zeolites exchanged with transition metals are used as catalysts for applications of selective catalytic reduction (SCR) with ammonia ($NH_3$-SCR), in transport. Small-pore zeolites, particularly copper-exchanged chabazites, are particularly suitable. They exist commercially in the form of silico-aluminophosphate Cu-SAPO-34, or alumino-silicic compounds Cu-SSZ-13 (or Cu-SSZ-62). Their hydrothermal resistance and NOx conversion efficiency, in particular at low temperatures, make them the current references.

The use of zeolites with AFX structure for $NH_3$-SCR applications is known, but few studies evaluate the efficiency of catalysts using this zeolite.

Fickel et al. (Fickel, D W, & Lobo, R F (2009), The Journal of Physical Chemistry C, 114 (3), 1633-1640) studies the use of a copper-exchanged SSZ-16 (with AFX structure) for NOx removal. This zeolite is synthesized in accordance with U.S. Pat. No. 5,194,235, in which Cu is introduced by exchange using copper(II) sulfate at 80° C. for 1 h. Recent results (Fickel, D W, D'Addio, E., Lauterbach, J A, & Lobo, R F (2011), 102 (3), 441-448) show excellent conversion and good hydrothermal resistance for copper-loading at 3.78% by weight.

Work on the synthesis of zeolites with AFX structure has been carried out with various structural agents (Lobo, R F, Zones, S I, & Medrud, R C (1996), Chemistry of Materials, 8 (10), 2409-2411) as well as synthesis optimization work (Hrabanek, P., Zikanova, A., Supinkova, T., Drahokoupil, J., Fila, V., Lhotka, M., Bernauer, B. (2016), Microporous and Mesoporous Materials, 228, 107-115).

Wang et al. (Wang, D. et al., Cryst Eng Comm., (2016), 18 (6), 1000-1008) have studied the replacement of the TMHD structuring agent with a TEA-TMA mixture for the formation of SAPO-56 and obtained unwanted SAPO-34 and SAPO-20 phases. The incorporation of transition metals is not discussed.

US 2016/0137518 describes the synthesis of a quasi-pure AFX zeolite exchanged with a transition metal and its use for $NH_3$-SCR applications. No particular form of AFX zeolite is mentioned; however, the materials formed are of silica-alumina type and not silico-aluminophosphate type.

Document JP 2014-148441 describes the synthesis of an AFX zeolite, in particular a copper-comprising SAPO-56 which can be used for $NO_x$ reduction. The AFX zeolite is synthesized and then added to a mixture comprising an alcohol and a copper salt, the whole mixture being calcined. The copper is thus added once the SAPO zeolite with AFX structure is formed. This zeolite appears to have increased resistance to the presence of water.

WO 2017/080722 discloses a direct synthesis of a copper-comprising zeolite. This synthesis requires starting from a zeolite with FAU structure and using a complexing agent TEPA and an element $M(OH)_x$ to obtain zeolites of various types, mainly of CHA type. Zeolites of ANA, ABW, PHI and GME type are also produced.

The applicant has discovered a process for the direct synthesis of a copper-comprising SAPO material with AFX structure, exhibiting advantageous performance levels for $NO_x$ conversion, in particular greater than those obtained with copper-exchanged SAPO zeolites with AFX structure.

An advantage of the process according to the invention is to obtain, by means of a set of specific operating conditions, a SAPO material with pure AFX structure, that is to say without any other crystalline or amorphous phase being observed by X-ray diffraction (XRD).

Subject and Advantage of the Invention

The direct synthesis process according to the invention makes it possible to obtain a copper-comprising SAPO material with AFX structure having improved properties compared to the catalysts of the prior art while at the same time simplifying the conventional synthesis. In particular, using the catalyst prepared according to the invention makes it possible to obtain a better conversion in the $NO_x$ conversion reaction by decreasing the amount of $NO_2$ produced.

DETAILED DESCRIPTION OF THE INVENTION

The invention relates to a process for preparing a copper-containing SAPO material with AFX structure, comprising at least the following steps:

a) mixing, in an aqueous medium, of at least one aluminum source, at least one silicon source, at least one copper source, at least one phosphorus source, a complexing agent, TETA, and a structuring agent, TMHD, in order to obtain a gel of molar composition:

$aSiO_2:bAl_2O_3:cP_2O_5:d$TMHD:$e$CuSO$_4$:$f$TETA:$g$H$_2$O a/c being between 0.1 and 1, b/c being between 0.1 and 1, g/c being between 1 and 100, d/c being between 0.5 and 4, e/c being between 0.005 and 0.1 and f/e being between 1 and 1.5;

b) hydrothermal treatment of said gel at a temperature of between 170 and 220° C., under an autogenous reaction pressure, for a period of between 1 and 3 days with a shear rate of less than 50 s$^{-1}$ in order to obtain the crystallization of said copper-comprising SAPO material with AFX structure.

Mixing Step a)

The preparation process according to the invention comprises a step a) of mixing, in an aqueous medium, of at least one aluminum source, at least one silicon source, at least one copper source, at least one phosphorus source, a TETA complexing agent and a TMHD structuring agent in order to obtain a gel of formula:

$aSiO_2:bAl_2O_3:cP_2O_5:d$TMHD:$e$CuSO$_4$:$f$TETA:$g$H$_2$O a/c being between 0.1 and 1, b/c being between 0.1 and 1, g/c being between 1 and 100, d/c being between 0.5 and 4, e/c being between 0.005 and 0.1 and f/e being between 1 and 1.5.

Preferably, a/c is between 0.2 and 0.9, more preferably between 0.4 and 0.8. Preferably, b/c is between 0.4 and 0.9, more preferably from 0.6 to 0.8. Preferably, g/c is between 10 and 70, more preferably between 30 and 50. Preferably, d/c is between 1 and 2.5. Preferably, e/c is between 0.01 and 0.09, more preferably from 0.02 to 0.08.

The aluminum source may be any aluminum source known to those skilled in the art. In particular, the aluminum source is preferably sodium aluminate or an aluminum salt, for example chloride, nitrate, hydroxide or sulfate, an aluminum alkoxide or alumina as such, preferably in hydrated or hydratable form, such as, for example, colloidal alumina, pseudo-boehmite, gamma-alumina or alpha or beta trihydrate, or an aluminosilicon zeolite such as, for example, USY (Ultrastable Y, with FAU structure). Use may also be made of mixtures of the sources mentioned above.

The silicon source may be any silicon source known to those skilled in the art. In particular, the silicon source is preferably powdered silica, silicic acid, colloidal silica, dissolved silica or tetraethoxysilane (TEOS) or an aluminosilicon zeolite such as, for example, USY (Ultrastable Y, with FAU structure). Among the powdered silicas, use may be made of precipitated silicas, especially those obtained by precipitation from a solution of alkali metal silicate, fumed silicas, for example Cab-O-Sil, and silica gels. Colloidal silicas having various particle sizes, for example a mean equivalent diameter of between 10 and 15 nm or between 40 and 50 nm may be used, such as those sold under registered brand names such as Ludox. Preferably, the silicon source is Cab-O-Sil M5.

The copper source is at least one species capable of releasing copper in solution in reactive form, such as, for example, sulfates, nitrates, chlorides, oxalates, organometallic copper complexes, but also mixtures of the sources mentioned above. Preferably, the copper source is chosen from sulfates and nitrates.

The phosphorus source may be chosen from phosphorus-based acids such as, for example, phosphoric acid or phosphorous acid, and organic phosphates such as, for example, triethyl phosphate. The phosphorus source may also be an aluminophosphate. Preferably, the phosphorus source is phosphoric acid ($H_3PO_4$).

The structuring agent is N,N,N',N'-tetramethyl-1,6-hexanediamine (TMHD). This structuring agent makes it possible to obtain a SAPO material with AFX structure.

The complexing agent used in step a) of the process according to the invention is triethylenetetramine (TETA). The applicant has discovered that the specific use of TETA in combination with the other parameters of the process according to the invention, in particular a low shear rate, of less than 50 $s^{-1}$, makes it possible to obtain a copper-comprising SAPO material with AFX structure without the presence of other crystalline or amorphous phases observable by XRD, further having improved properties compared to a material prepared by other methods of synthesis.

The mixing of step a) is advantageously performed cold, at least for the addition of the aluminum source and/or phosphorus source, so as to limit the temperature rise due to the dilution exothermicity and allow homogeneous dissolution of the constituents. Advantageously, the addition of the aluminum source and/or the phosphorus source is carried out in an ice-cold water bath or any equipment allowing heat discharge in an equivalent manner and suitable for the volume of the mixture produced.

Hydrothermal Treatment Step b)

The preparation process according to the invention comprises a step b) of hydrothermal treatment of said gel at a temperature of between 170 and 220° C., under an autogenous reaction pressure, for a period of between 1 and 3 days with a shear rate of less than 50 $s^{-1}$ in order to obtain the crystallization of said copper-comprising SAPO material with AFX structure.

In accordance with step b) of the process according to the invention, the gel obtained at the end of the mixing step a) is subjected to a hydrothermal treatment, carried out at a temperature of between 170 and 220° C., preferably between 190 and 210° C., under an autogenous reaction pressure, for a period of between 1 and 3 days, preferably between 1 and 2 days, to obtain the crystallization of said SAPO zeolite with AFX structure. At the end of the hydrothermal treatment, the solid obtained is filtered off, washed and then dried to obtain said SAPO zeolite with AFX structure in powder form.

The gel is advantageously placed under hydrothermal conditions under an autogenous reaction pressure, by adding gas, for example nitrogen.

Step b) of the preparation process according to the invention is carried out with a shear rate of less than 50 $s^{-1}$, therefore between 0 and 50 $s^{-1}$. A shear rate of 0 $s^{-1}$ corresponds to a static mode, that is to say in the absence of agitation. In one preferred embodiment, step b) of the preparation process according to the invention is carried out in static mode. In another preferred embodiment, step b) of the preparation process according to the invention is carried out with a shear rate of between 0.1 and 50 $s^{-1}$, for example with an Archimedes screw. The applicant has in fact discovered that the use of a static mode or a mode with a very low shear in combination with the other parameters of the process according to the invention, in particular the use of a TETA complexing agent, makes it possible to obtain a copper-comprising SAPO material with AFX structure without the presence of other crystalline or amorphous phases observable by XRD, which furthermore has improved properties compared to a material prepared by other methods of synthesis.

At the end of step b), the copper-comprising SAPO material with AFX structure without the presence of other crystalline or amorphous phases observable by XRD is obtained. Its X-ray diffraction pattern corresponds to the International Center for Diffraction Data (ICDD) sheet number: 04-013-1370.

Heat Treatment Step c)

The preparation process according to the invention advantageously comprises a heat treatment step c) carried out after step b), comprising a treatment under dry inert gas, advantageously nitrogen, at a temperature of between 400 and 600° C., preferentially between 500 and 600° C., for a period of between 5 and 15 h, preferentially between 6 and 10 h, followed by combustion treatment in dry air, at a temperature of between 400 and 600° C., preferably between 500 and 600° C. for a period of between 5 and 15 h, preferentially between 6 and 10 h, the dry air flow rate preferably being between 0.5 and 1.5 l/h/g of solid to be treated, preferentially between 0.7 and 1.2 l/g/h.

The first treatment under inert gas allows in particular a thermocracking of the organic molecules before releasing the porosity during the combustion treatment. In particular, said treatment under inert gas makes it possible to maintain the integrity of the structure of the material prepared by the process according to the invention during the combustion treatment.

At the end of said advantageous step c), the material prepared according to the invention can be used as a catalyst, adsorbent, catalyst support or any other application known to those skilled in the art for a copper-comprising SAPO material with AFX structure.

The material obtained is in the form of a light blue-colored powder, the intensity of which depends on the amount of copper contained and its X-ray diffraction pattern corresponds to a SAPO with AFX structure, as defined by the International Zeolite Association (IZA). The amount of copper contained in said material can range from 0.5 to 8% by weight of the total weight of the material in its anhydrous form.

Exchange Step d)

The preparation process according to the invention advantageously comprises, at the end of step b) of the process according to the invention, or of step c) of the process according to the invention if it is carried out, an ion exchange step which comprises bringing the solid obtained at the end of step b), advantageously at the end of step c), into contact with a solution comprising a species capable of releasing copper in solution in reactive form, preferably chosen from sulfates, nitrates, chlorides, oxalates, organometallic copper complexes and mixtures thereof, with stirring at ambient temperature for a period of between 1 h and 2 d, advantageously for a period of between 0.5 and 1.5 d, the concentration of said species capable of releasing copper in said solution being as a function of the amount of copper that it is desired incorporate into said solid. The amount of copper contained in said solid is ultimately between 0.5 and 8% by weight relative to the total weight of the solid in its anhydrous form.

The Applicant has discovered that the material obtained by the process according to the invention has characteristics different than the copper-comprising SAPO materials with AFX structure known hitherto. In particular, the material obtained by the process according to the invention has improved properties for $NO_x$ conversion. The invention therefore also relates to a copper-comprising SAPO material with AFX structure obtained by the process according to the invention, comprising at least the following steps:

a) mixing, in an aqueous medium, of at least one aluminum source, at least one silicon source, at least one copper source, at least one phosphorus source, a complexing agent, TETA, and a structuring agent, TMHD, in order to obtain a gel of formula:

$aSiO_2 : bAl_2O_3 : cP_2O_5 : dTMHD : eCuSO_4 : fTETA : gH_2O$ a/c being between 0.1 and 1, b/c being between 0.1 and 1, g/c being between 1 and 100, d/c being between 0.5 and 4, e/c being between 0.005 and 0.1 and f/e being between 1 and 1.5;

b) hydrothermal treatment of said gel at a temperature of between 170 and 220° C., under an autogenous reaction pressure, for a period of between 1 and 3 days with a shear rate of less than 50 s$^{-1}$ in order to obtain the crystallization of said copper-comprising SAPO material with AFX structure.

Characterization of the Catalyst Prepared According to the Invention

The material prepared according to the invention has an AFX structure according to the classification of the International Zeolite Association (IZA). This structure is characterized by X-ray diffraction (XRD).

The X-ray diffraction (XRD) pattern is obtained by radiocrystallographic analysis by means of a diffractometer using the conventional powder method with K$\alpha_1$ radiation of copper ($\lambda$=1.5406 Å). On the basis of the position of the diffraction peaks represented by the angle 2θ, the lattice constant distances $d_{hkl}$ characteristic of the sample are calculated using the Bragg relationship. The measurement error $\Delta(d_{hkl})$ on $d_{hkl}$ is calculated by virtue of the Bragg relationship as a function of the absolute error $\Delta(2\theta)$ assigned to the measurement of 2θ. An absolute error $\Delta(2\theta)$ equal to ±0.02° is commonly accepted. The relative intensity $I_{rel}$ assigned to each value of $d_{hkl}$ is measured according to the height of the corresponding diffraction peak. Comparison of the diffraction pattern with the ICDD (International Center for Diffraction Data) database sheets using software such as, for example, DIFFRACT.SUITE also makes it possible to identify the crystal phases present in the material obtained.

The qualitative and quantitative analysis of the chemical species present in the materials obtained is carried out by X-ray fluorescence (XRF) spectrometry. This is a technique of chemical analysis using a physical property of matter, the X-ray fluorescence. The spectrum of X-rays emitted by the material is characteristic of the composition of the sample; by analyzing this spectrum, it is possible to deduce the elemental composition, that is to say the mass concentrations of elements.

The loss on ignition of a sample, referred to as LOI, is calculated as the difference in mass of the sample before and after calcining at 550° C. for 2 h. It is expressed in % corresponding to the percentage loss of mass.

Use of the Catalyst Prepared According to the Invention

The invention also relates to the use of the material prepared by the process according to the invention, advantageously formed by deposition in the form of a washcoat on a filtering or non-filtering, honeycomb structure, for selective reduction of $NO_x$ using a reducing agent such as $NH_3$ or $H_2$. Said honeycomb structure thus coated constitutes a catalytic block. Said structure may be composed of cordierite, silicon carbide (SiC), aluminum titanate (AlTi) or any other material of which the porosity is between 30 and 70%. The amount of material prepared by the process according to the invention that is deposited on said structure is between 40 and 140 g/l for filtering structures and between 120 and 200 g/l for structures with open channels.

The actual washcoat comprises the copper-comprising SAPO material with AFX structure prepared according to the invention, advantageously in combination with a binder such as cerine, zirconium oxide, alumina, non-zeolite silica-alumina, titanium oxide, a cerine-zirconia mixed oxide, or a tungsten oxide. Said washcoat is advantageously a solution or a suspension. It is applied to said structure in any manner known to those skilled in the art.

Said structure may be coated with one or more layers. The coating comprising the copper-comprising SAPO material with AFX structure prepared according to the invention is advantageously in combination with, that is to say covers a or is covered by, another coating having NOx reducing capacities or capacities which promote the oxidation of pollutants, in particular that of ammonia.

Said structure coated with the material prepared by the process according to the invention is advantageously integrated in an exhaust line of an internal combustion engine operating mainly in lean mixture mode, that is to say with excess air relative to the stoichiometry of the combustion reaction, as is the case with diesel engines for example. Under these engine operating conditions, the exhaust gases contain the following pollutants: soot, unburned hydrocarbons (HCs), carbon monoxide (CO), nitrogen oxides (NOx). Upstream of said structure may be placed an oxidation catalyst of which the function is to oxidize HCs and CO and a filter for removing soot from the exhaust gases, the function of said structure being to remove the NOx, its operating range being between 100 and 900° C. and preferably between 200° C. and 500° C.

EXAMPLES

Figure 1:
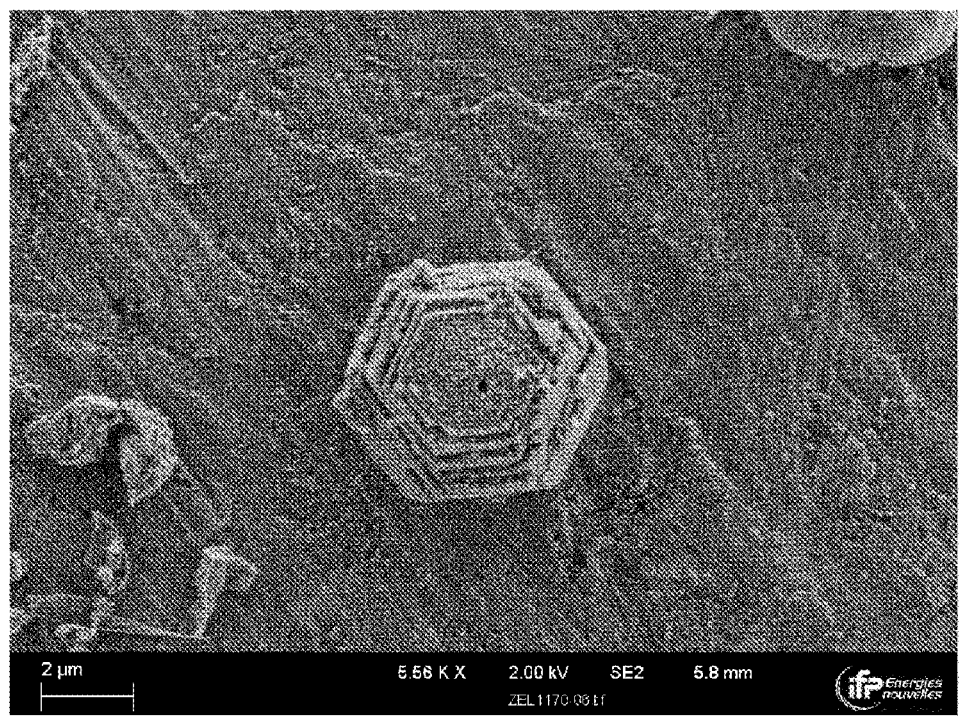
FIG. 1 shows an image obtained by scanning electron microscopy (SEM) of the Cu-SAPO material with AFX structure obtained by the process according to the invention.

Example 1 (not in Accordance with the Invention)

In this example, a Cu-exchanged SAPO-56 zeolite is synthesized according to the prior art. In this example, the copper is introduced by ion exchange.

Mixing Step 131.33 g of phosphoric acid and 62.30 g of alumina (pseudo-boehmite Pural SB3) are cold mixed in 213.80 g of water. This mixture is kept in an ice-cold water bath and dispersed with vigorous stirring. The mixture is made up with 125.80 g of deionized water with stirring until homogenization. 20.39 g of fumed silica, then 197.17 g of TMHD structuring agent are added with vigorous stirring at ambient temperature until homogenization of the suspension.

The reaction mixture has the following molar composition: 0.6 $SiO_2$:0.8 $Al_2O_3$:1.0 $P_2O_5$:2 TMHD:40 $H_2O$ Hydrothermal Treatment Step The gel obtained is left in an autoclave at a temperature of 200° C. for 4 days without stirring. The crystals obtained are separated and washed with deionized water until a pH of the washing water of less than 8 is obtained. The washed material is dried.

An XRD analysis shows that the product obtained is a pure crude synthetic SAPO-56 zeolite with AFX structure (ICDD sheet, PDF 04-03-1370).

Heat Treatment Step

The crude synthetic SAPO-56 zeolite is treated under a stream of dry $N_2$ at 550° C. for 8 h, then calcined under a stream of dry air at 550° C. for 8 h. The loss on ignition (LOI) is 21% by weight.

Cu Ion Exchange on Calcined SAPO-56

The calcined SAPO-56 zeolite is brought into contact with a solution of $[Cu(NH_3)_4](NO_3)_2$ for 1 day with stirring at ambient temperature. The final solid is separated, washed and dried. An XRD analysis shows that the product obtained is a pure crude synthetic SAPO-56 zeolite with AFX structure (ICDD sheet, PDF 04-03-1370).

The X-ray fluorescence (XRF) chemical analysis gave an Si/Al and Cu/Al molar ratio of 0.21 and 0.10, respectively.

Example 2 (not in Accordance with the Invention)

In this example, the aim is to synthesize a SAPO-56 zeolite with direct incorporation of Cu using a complexing agent, tetraethylenepentamine (TEPA), and low shear crystallization.

Mixing Step 13.73 g of phosphoric acid and 6.54 g of alumina (pseudo-boehmite Pural SB3) are cold mixed in 30.33 g of water. This mixture is kept in an ice-cold water bath and dispersed with vigorous stirring. 2.14 g of fumed silica are added at ambient temperature. 0.89 g of copper sulfate are dissolved in 5.01 g of deionized water with stirring for 5 minutes, then 0.69 g of TEPA and 20.70 g of TMHD structuring agent are added with vigorous stirring at ambient temperature until the suspension is homogenized.

The reaction mixture has the following molar composition: 0.6 $SiO_2$:0.8 $Al_2O_3$:1.0 $P_2O_5$:2 TMHD:0.06 $CuSO_4$:0.06 TEPA:40 $H_2O$ Hydrothermal Treatment Step The gel obtained is separated into 4 samples left in an autoclave at a temperature of 200° C. for 1, 2, 3 and 4 days, respectively, with stirring, with a shear rate of 40 $s^{-1}$. The crystals obtained are separated and washed with deionized water until a pH of the washing water of less than 8 is obtained. The washed material is dried.

The XRD analyses show that the product obtained after 1, 2, 3 and 4 days of autoclaving is a SAPO-56 zeolite (ICDD sheet, PDF 04-03-1370) at approximately 85% by weight, mixed with the SAPO-34 zeolite (ICDD sheet, PDF 00-047-0429) at approximately 15% by weight.

In this example, it is not possible to synthesize a pure copper-comprising SAPO material with AFX structure.

Example 3 (not in Accordance with the Invention)

In this example, the aim is to synthesize a SAPO-56 zeolite with direct incorporation of Cu using a complexing agent, tetraethylenepentamine (TEPA), and high shear crystallization.

The mixing step is carried out in the same manner as in example 2.

Hydrothermal Treatment Step

The gel obtained is left in an autoclave at a temperature of 200° C. for 4 days with stirring with a high shear (greater than 1000 $s^{-1}$). The crystals obtained are separated and washed with deionized water until a pH of the washing water of less than 8 is obtained. The washed material is dried.

An XRD analysis indicates the presence of a mixture of SAPO-17 (ICDD sheet, PDF 00-047-0621) and SAPO-34 (ICDD sheet, PDF 00-047-0429). It is observed that SAPO-56 is not obtained under these synthesis conditions.

Example 4 (in Accordance with the Invention)

In this example, a SAPO-56 zeolite is synthesized with direct incorporation of Cu using a complexing agent, triethylenetetramine (TETA), and low shear crystallization.

Mixing Step 13.74 g of phosphoric acid and 6.55 g of alumina (pseudo-boehmite Pural SB3) are cold mixed in 30.38 g of water. This mixture is kept in an ice-cold water bath and dispersed with vigorous stirring. 2.15 g of fumed silica are added at ambient temperature. 0.90 g of copper sulfate are dissolved in 5.02 g of deionized water with stirring for 5 minutes, then 0.52 g of TETA and 20.74 g of TMHD structuring agent are added with vigorous stirring at ambient temperature until the suspension is homogenized.

The reaction mixture has the following molar composition: 0.6 $SiO_2$:0.8 $Al_2O_3$:1.0 $P_2O_5$:2 TMHD:0.06 $CuSO_4$:0.06 TETA:40 $H_2O$ Hydrothermal Treatment Step The gel obtained is separated into 2 samples left in an autoclave at a temperature of 200° C. for 1 and 2 days, respectively, with stirring, with a shear rate of 40 $s^{-1}$. The crystals obtained are separated and washed with deionized water until a pH of the washing water of less than 8 is obtained. The washed material is dried.

An XRD analysis shows that the product obtained is a pure Cu-SAPO-56 zeolite (ICDD sheet, PDF 04-03-1370) with AFX structure, and that the hydrothermal treatment step lasted one or two days.

Heat Treatment Step

A sample is treated under a stream of dry $N_2$ at 550° C. for 8 h, and then calcined under a stream of dry air at 550° C. for 8 h.

An XRD analysis shows that the product obtained is a pure zeolite with AFX structure. The X-ray fluorescence (XRF) chemical analysis gave an Si/Al and Cu/Al molar ratio of 0.21 and 0.11, respectively.

Example 5 (not in Accordance with the Invention)

In this example, the aim is to synthesize a SAPO-56 zeolite with direct incorporation of Cu using a complexing agent, triethylenetetramine (TETA), and high shear crystallization.

The mixing step is carried out in the same manner as in example 4.

Hydrothermal Treatment Step

The gel obtained is left in an autoclave at a temperature of 200° C. for 3 days with stirring with high shear (shear rate greater than 1000 $s^{-1}$). The crystals obtained are separated and washed with deionized water until a pH of the washing water of less than 8 is obtained. The washed material is dried.

An XRD analysis shows that the product obtained is a mixture of SAPO-56 zeolite (ICDD sheet, PDF 04-03-1370) and SAPO-20 zeolite (ICDD sheet, PDF 00-045-0510).

Example 6 (not in Accordance with the Invention)

In this example, the intention is to synthesize a Cu-SAPO-56 zeolite with direct incorporation of Cu using a complexing agent, triethylenetetramine (TETA), high shear crystallization and a shorter crystallization time than in example 5.

The mixing step is carried out in the same manner as in example 4.

Hydrothermal Treatment Step

The gel obtained is left in an autoclave at a temperature of 200° C. for 1 day with stirring with high shear (shear rate greater than 1000 $s^{-1}$). The crystals obtained are separated and washed with deionized water until a pH of the washing water of less than 8 is obtained. The washed material is dried.

An XRD analysis shows that the product obtained with high shear crystallization is a mixture of SAPO-56 zeolite (ICDD sheet, PDF 04-03-1370) and SAPO-17 zeolite (ICDD sheet, PDF 00-047-0621).

Example 7 (in Accordance with the Invention)

This example differs from example 4 by virtue of a different composition of the gel obtained at the end of the mixing step.

Mixing Step 13.56 g of phosphoric acid and 6.47 g of alumina (pseudo-boehmite Pural SB3) are cold mixed in 29.14 g of water. This mixture is kept in an ice-cold water bath and dispersed with vigorous stirring. 2.82 g of fumed silica are added at ambient temperature. 1.17 g of copper sulfate are dissolved in 5.70 g of deionized water with stirring for 5 minutes, then 0.69 g of TETA and 20.47 g of TMHD structuring agent are added with vigorous stirring at ambient temperature until the suspension is homogenized.

The reaction mixture has the following molar composition: 0.8 $SiO_2$:0.8 $Al_2O_3$:1.0 $P_2O_5$:2 TMHD:0.08 $CuSO_4$: 0.08 TETA:40 $H_2O$ Hydrothermal Treatment Step The gel obtained is separated into several samples left in an autoclave at a temperature of 200° C. for a period of 1 to 2 days with stirring with low shear (shear rate of 40 $s^{-1}$). The crystals obtained are separated and washed with deionized water until a pH of the washing water of less than 8 is obtained. The washed material is dried.

An XRD analysis shows that the product obtained is pure Cu-SAPO-56 zeolite (ICDD sheet, PDF 00-047-0621), for all the durations of the hydrothermal treatment step of between one and two days.

Heat Treatment Step

A sample is treated under a stream of dry $N_2$ at 550° C. for 8 h, and then calcined under a stream of dry air at 550° C. for 8 h.

An XRD analysis shows that the product obtained is a pure zeolite with AFX structure. The X-ray fluorescence (XRF) chemical analysis gave an Si/Al and Cu/Al ratio of 0.25 and 0.13, respectively.

Example 8 (in Accordance with the Invention)

This example differs from example 4 by virtue of a different composition of the gel obtained at the end of the mixing step.

Mixing Step 13.93 g of phosphoric acid and 6.64 g of alumina (pseudo-boehmite Pural SB3) are cold mixed in 30.08 g of water. This mixture is kept in an ice-cold water bath and dispersed with vigorous stirring. 1.45 g of fumed silica are added at ambient temperature. 0.60 g of copper sulfate are dissolved in 5.92 g of deionized water with stirring for 5 minutes, then 0.35 g of TETA and 21.03 g of TMHD structuring agent are added with vigorous stirring at ambient temperature until the suspension is homogenized.

The reaction mixture has the following molar composition: 0.4 $SiO_2$: 0.8 $Al_2O_3$:1.0 $P_2O_5$:2 TMHD:0.04 $CuSO_4$: 0.04 TETA:40 $H_2O$ Hydrothermal Treatment Step The gel obtained is separated into several samples left in an autoclave at a temperature of 200° C. for a period of 1 to 2 days with stirring with low shear (shear rate of 40 $s^{-1}$). The crystals obtained are separated and washed with deionized water until a pH of the washing water of less than 8 is obtained. The washed material is dried.

An XRD analysis shows that the product obtained is a pure Cu-SAPO-56 zeolite (ICDD sheet, PDF 00-047-0621), for all the durations of the hydrothermal treatment step of between one and two days.

Heat Treatment Step

A sample is treated under a stream of dry $N_2$ at 550° C. for 8 h, and then calcined under a stream of dry air at 550° C. for 8 h.

An XRD analysis shows that the product obtained is a pure zeolite with AFX structure. The X-ray fluorescence (XRF) chemical analysis gave an Si/Al and Cu/Al ratio of 0.17 and 0.08, respectively.

Example 9 (in Accordance with the Invention)

In this example, the aim is to synthesize a SAPO-56 zeolite with direct incorporation of Cu using a complexing agent, triethylenetetramine (TETA), and crystallization without stirring.

All the steps are carried out in the same way as in example 4, but the hydrothermal treatment is carried out without stirring.

An XRD analysis shows that the product obtained is a pure zeolite with AFX structure. The X-ray fluorescence (XRF) chemical analysis gave an Si/Al and Cu/Al molar ratio of 0.21 and 0.11, respectively.

Example 10 (in Accordance with the Invention)

In this example, a SAPO-56 zeolite is synthesized with direct incorporation of Cu using a complexing agent, triethylenetetramine (TETA), and low shear crystallization. An additional amount of Cu is introduced by ion exchange.

Mixing Step 13.74 g of phosphoric acid and 6.55 g of alumina (pseudoboehmite Pural SB3) are cold mixed in 30.38 g of water. This mixture is kept in an ice-cold water bath and dispersed with vigorous stirring. 2.15 g of fumed silica are added at ambient temperature. 0.36 g of copper sulfate are dissolved in 5.02 g of deionized water with stirring for 5 minutes, then 0.21 g of TETA and 20.74 g of TMHD structuring agent are added with vigorous stirring at ambient temperature until the suspension is homogenized.

The reaction mixture has the following molar composition: 0.6 $SiO_2$:0.8 $Al_2O_3$:1.0 $P_2O_5$:2 TMHD:0.024 $CuSO_4$: 0.024 TETA:40 $H_2O$ Hydrothermal Treatment Step The gel obtained is separated into 2 samples left in an autoclave at a temperature of 200° C. for 1 and 2 days, respectively, with stirring, with a shear rate of 40 $s^{-1}$. The crystals obtained are separated and washed with deionized water until a pH of the washing water of less than 8 is obtained. The washed material is dried.

An XRD analysis shows that the product obtained is a pure SAPO-56 zeolite (ICDD sheet, PDF 00-047-0621) with AFX structure, and that the hydrothermal treatment step lasted one or two days.

Heat Treatment Step

A sample is treated under a stream of dry $N_2$ at 550° C. for 8 h, and then calcined under a stream of dry air at 550° C. for 8 h.

An XRD analysis shows that the product obtained is a pure zeolite with AFX structure. The X-ray fluorescence (XRF) chemical analysis gave an Si/Al and Cu/Al molar ratio of 0.21 and 0.04, respectively.

Cu Ion Exchange on Calcined Cu-SAPO-56

The calcined Cu-SAPO-56 zeolite obtained in this example is brought into contact with a solution of [Cu(NH$_3$)$_4$](NO$_3$)$_2$ for 1 day with stirring at ambient temperature. The final solid is separated and dried.

An XRD analysis shows that the product obtained is a pure SAPO-56 zeolite (ICDD sheet, PDF 00-047-0621).

The X-ray fluorescence (XRF) chemical analysis gave an Si/Al and Cu/Al molar ratio of 0.21 and 0.11, respectively.

Example 11

In order to evaluate the $NO_x$ conversion activity of the various materials prepared, a catalytic test is carried out for the reduction of nitrogen oxides ($NO_x$) by ammonia ($NH_3$) in the presence of oxygen ($O_2$) at various operating temperatures. The material not in accordance with the invention, prepared according to example 1, is compared to the materials in accordance with the invention, prepared according to examples 4, 7 and 8.

For each test, 200 mg of material in powder form is placed in a quartz reaction vessel. 145 l/h of a representative load of a mixture of exhaust gas from a diesel engine are fed into the reaction vessel.

This load has the following molar composition:

| | |
|---|---|
| $O_2$ | 8.5% |
| $CO_2$ | 9% |
| NO | 400 ppm |
| $NH_3$ | 400 ppm |
| $H_2O$ | 10% |
| $N_2$ | qpc |

Figure 2:
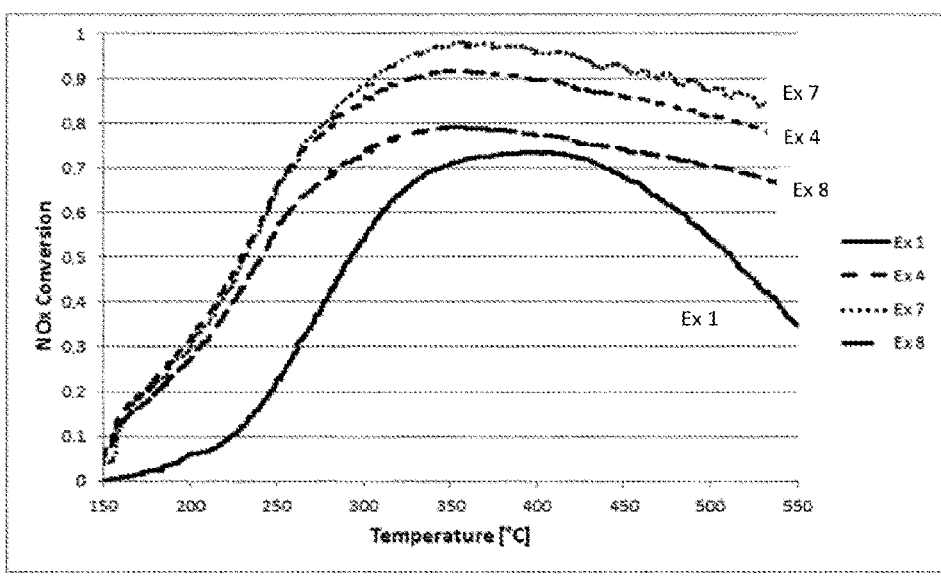
FIG. 2 shows the NOx conversion results, the Ex 1, Ex 4, Ex 7 and Ex 8 curves respectively corresponding to the tests carried out with the materials prepared according to example 1, example 4, example 7 and example 8. At the abscissa point 400° C., the curves correspond, respectively, from bottom to top to Ex 1, Ex 8, Ex 4 and Ex 7.
Figure 3:
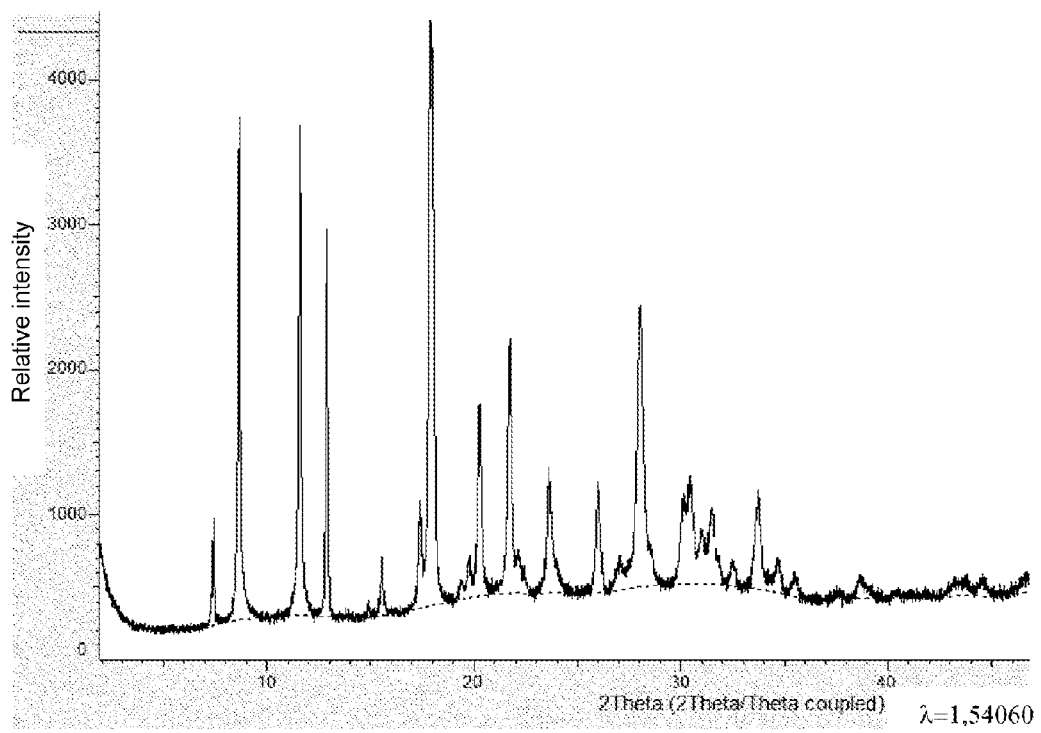
FIG. 3 shows an X-ray diffraction pattern of the Cu-SAPO material obtained according to example 7.

The conversion results are shown in FIG. 2, the Ex 1, Ex 4, Ex 7 and Ex 8 curves respectively corresponding to the tests carried out with the materials prepared according to example 1, example 4, example 7 and example 8.

It is observed that the materials prepared according to the invention have a better $NO_x$ conversion than the material prepared according to example 1, this being for all the temperatures tested.

The invention claimed is:

1. A process for preparing a copper-containing SAPO material with an AFX structure, comprising at least the following:
   a) mixing, in an aqueous medium, of at least one aluminum source, at least one silicon source, at least one copper source, at least one phosphorus source, a complexing agent, TETA, and a structuring agent, TMHD, in order to obtain a gel of formula:

$a$SiO$_2$:$b$Al$_2$O$_3$:$c$P$_2$O$_5$:$d$TMHD:$e$CuSO$_4$:$f$TETA:$g$H$_2$O a/c being 0.1 to 1, b/c being 0.1 to 1, g/c being 1 to 100, d/c being 0.5 to 4, e/c being 0.005 to 0.1 and f/e being 1 to 1.5;
   b) hydrothermal treatment of said gel at a temperature of 170 to 220° C., under an autogenous reaction pressure, for a period of 1 to 3 days with a shear rate of less than 50 $s^{-1}$ in order to obtain the crystallization of said copper-containing SAPO material with an AFX structure.

2. The process as claimed in claim 1, wherein said b) is carried out at a temperature of 190 to 210° C.

3. The process as claimed in claim 1, wherein said step b) is carried out for a period of 1 to 2 days.

4. The process as claimed in claim 1, wherein said b) is carried out in the absence of stirring.

5. The process as claimed in claim 1, wherein said b) is carried out with a shear rate of 0.1 to 50 $s^{-1}$.

6. The process as claimed in claim 1, comprising a heat treatment c) carried out at the end of b), comprising a treatment under dry inert gas, at a temperature of 400 to 600° C., for a period of 5 to 15 h, followed by a combustion treatment in dry air, at a temperature of 400 to 600° C., for a period of 5 to 15 h.

7. The process as claimed in claim 6, comprising an ion exchange which comprises bringing the solid obtained at the end of c) into contact with a solution comprising a species releasing copper in solution in reactive form with stirring at ambient temperature for a period of 1 h to 2 d.

8. The process as claimed in claim 6, wherein the dry air flow rate of said combustion treatment is 0.5 to 1.5 l/h/g of solid to be treated.

9. The process as claimed in claim 1, comprising an ion exchange which comprises bringing solid obtained at the end of b) into contact with a solution comprising a species releasing copper in solution in reactive form with stirring at ambient temperature for a period of 1 h to 2 d.

10. A process comprising preparing a copper-comprising SAPO material with an AFX structure by:
  a) mixing, in an aqueous medium, of at least one aluminum source, at least one silicon source, at least one copper source, at least one phosphorus source, a complexing agent, TETA, and a structuring agent, TMHD, in order to obtain a gel of formula:

$a\text{SiO}_2:b\text{Al}_2\text{O}_3:c\text{P}_2\text{O}_5:d\text{TMHD}:e\text{CuSO}_4:f\text{TETA}:g\text{H}_2\text{O}$ a/c being 0.1 to 1, b/c being 0.1 to 1, g/c being 1 to 100, d/c being 0.5 to 4, e/c being 0.005 to 0.1 and f/e being 1 to 1.5;
  b) hydrothermal treatment of said gel at a temperature of 170 to 220° C., under an autogenous reaction pressure, for a period of 1 to 3 days with a shear rate of less than 50 s$^{-1}$ in order to obtain the crystallization of said copper-comprising SAPO material with AFX structure, and c) selectively reducing NO$_x$ by contacting NO$_X$ and a reducing agent in the presence of the copper-comprising copper-containing SAPO.

11. A process for the selective reduction of NO$_x$ by a reducing agent, comprising contacting NO$_X$ and the reducing agent in the presence of the copper-containing SAPO with an AFX structure as claimed in claim 10.

12. The process as claimed in claim 11, wherein said material is formed by deposition in the form of a coating on a honeycomb structure.

13. The process as claimed in claim 12, wherein said coating comprises said material in combination with a binder.

14. The process as claimed in claim 13, wherein the binder is cerine, zirconium oxide, alumina, non-zeolite silica-alumina, titanium oxide, a cerine-zerconia mixed oxide, or a tungsten oxide.

15. The process as claimed in claim 12, wherein said coating is in combination with another coating having NO$_x$ reducing capacities or capacities which promote the oxidation of pollutants.

16. The process as claimed in claim 12, wherein said structure coated by said material is integrated in an exhaust line of an internal combustion engine.

* * * * *